US010261595B1

(12) United States Patent
Kin

(10) Patent No.: US 10,261,595 B1
(45) Date of Patent: Apr. 16, 2019

(54) HIGH RESOLUTION TRACKING AND RESPONSE TO HAND GESTURES THROUGH THREE DIMENSIONS

(71) Applicant: Facebook Technologies, LLC, Menlo Park, CA (US)

(72) Inventor: Kenrick Cheng-kuo Kin, Vancouver, WA (US)

(73) Assignee: Facebook Technologies, LLC, Menlo Park, CA (US)

(*) Notice: Subject to any disclaimer, the term of this patent is extended or adjusted under 35 U.S.C. 154(b) by 7 days.

(21) Appl. No.: 15/600,689

(22) Filed: May 19, 2017

(51) Int. Cl.
*G06F 3/00* (2006.01)
*G06F 3/01* (2006.01)
*G06F 3/0346* (2013.01)
*G06F 3/0481* (2013.01)
*G06F 3/0485* (2013.01)
*G06K 9/00* (2006.01)
*G06T 19/00* (2011.01)

(52) U.S. Cl.
CPC ............ *G06F 3/017* (2013.01); *G06F 3/0346* (2013.01); *G06F 3/0485* (2013.01); *G06F 3/04815* (2013.01); *G06K 9/00355* (2013.01); *G06T 19/003* (2013.01); *G06T 19/006* (2013.01)

(58) Field of Classification Search
CPC .... G06F 3/017; G06F 3/0346; G06F 3/04815; G06F 3/0485; G06K 9/00355; G06T 19/006; G06T 19/003; G09G 5/00
See application file for complete search history.

(56) References Cited

U.S. PATENT DOCUMENTS

| | | | | |
|---|---|---|---|---|
| 9,594,491 B2* | 3/2017 | Lala | ..................... | G06F 3/04847 |
| 2010/0192109 A1* | 7/2010 | Westerman | ......... | G06F 3/04883 715/863 |
| 2011/0280441 A1* | 11/2011 | Chen | ....................... | G06F 3/017 382/103 |
| 2013/0283213 A1* | 10/2013 | Guendelman | ........... | G06F 3/017 715/848 |
| 2014/0028567 A1* | 1/2014 | Park | ....................... | G06F 3/005 345/168 |
| 2014/0098018 A1* | 4/2014 | Kim | ....................... | G06F 3/014 345/156 |
| 2014/0240216 A1* | 8/2014 | Bukurak | ............... | G06F 9/4856 345/156 |
| 2014/0298672 A1* | 10/2014 | Straker | ................. | H04W 12/06 34/175 |

(Continued)

*Primary Examiner* — Md Saiful A Siddiqui
(74) *Attorney, Agent, or Firm* — Fenwick & West LLP

(57) ABSTRACT

A system includes an electronic display configured to display one or more simulated objects in accordance with display instructions, an imaging sensor configured to capture images of a user's hands, and a console. The console is configured to receive the captured images from the imaging sensor, extract joint information of the user's hands from the captured images, and determine one or more poses based on the extracted joint information. In response to the determined poses indicating the user's index finger positioned orthogonally to the user's thumb, and the thumb within a minimum distance to the index finger, the console detects a directional pad display gesture, and update the display instructions to cause the electronic display to generate a simulated directional pad adjacent to the user's thumb in a simulated environment that is presented to the user via the electronic display.

20 Claims, 11 Drawing Sheets

(56) References Cited

U.S. PATENT DOCUMENTS

| | | | |
|---|---|---|---|
| 2015/0220922 A1* | 8/2015 | Elangovan | G06Q 20/40 705/44 |
| 2015/0235409 A1* | 8/2015 | Grossman | G06F 3/048 345/421 |
| 2016/0100166 A1* | 4/2016 | Dragne | H04N 19/124 375/240.03 |
| 2016/0224119 A1* | 8/2016 | Wu | G06F 3/0488 |
| 2016/0320853 A1* | 11/2016 | Lien | G01S 13/66 |
| 2017/0097687 A1* | 4/2017 | Pinault | G06F 3/017 |
| 2017/0131964 A1* | 5/2017 | Baek | G06F 3/1438 |
| 2017/0220856 A1* | 8/2017 | Mohandes | G06K 9/00355 |
| 2018/0011628 A1* | 1/2018 | Kano | G06F 3/04845 |
| 2018/0101237 A1* | 4/2018 | Lu | G06F 3/017 |
| 2018/0343023 A1* | 11/2018 | Park | H04W 76/14 |

\* cited by examiner

US 10,261,595 B1

HIGH RESOLUTION TRACKING AND RESPONSE TO HAND GESTURES THROUGH THREE DIMENSIONS

BACKGROUND

The present disclosure generally relates to motion tracking, and specifically tracking and responding to hand gestures through three dimensions.

Virtual reality (VR) is a simulated environment created by computer technology and presented to a user, such as through a system. Similarly, augmented reality (AR) or mixed reality (MR) combine a computer-simulated environment with reality for presentation to a user through an AR/MR system. Typically, a VR/AR/MR system includes a headset that provides visual and audio information to the user. However, when wearing the headset, the user is unable to see the user's hands or interact with the simulated environment presented by the headset with the user's hands. Conventional systems create virtual hands in the simulated environment and use a hand tracking system to track motion and positions of the user's hands. However, conventional hand tracking systems are often unable to accurately track positions of the user's fingers and thumbs, or and thus are unable to track the precise movements of the user's digits and hand through space and time, causing poor representation of movement of the user's hand by virtual hands of the user within the simulated environment.

SUMMARY

Embodiments herein describe a system for detection of various gestures performed by a user's hands or other appendages in a simulated environment. The user's hand positions are detected by an imaging sensor. A series of such positions are captured and a likely gesture is determined based on the hand positions. The detected gesture causes a change in display instructions to an electronic display presented to a user of the system. The display instructions cause a change in simulated elements in the simulated environment in response to the detected gesture.

In one embodiment, a system comprises an electronic display configured to display one or more simulated objects in accordance with display instructions, an imaging sensor configured to capture images of a user's hands, and a console. The console is configured to receive the captured images from the imaging sensor, extract joint information of the user's hands from the captured images, and determine one or more poses based on the extracted joint information. In response to the determined poses indicating the user's index finger positioned orthogonally to the user's thumb, and the thumb within a minimum distance to the index finger, the console detects a directional pad display gesture, and update the display instructions to cause the electronic display to generate a simulated directional pad adjacent to the user's thumb in a simulated environment that is presented to the user via the electronic display.

Using such a system, a user is able to perform various gestures to cause changes in a simulated virtual reality, augmented reality, and/or mixed reality environment. For example, a user may interact with a simulated drawing pad in a simulated environment and perform various motions to cause the system to detect a pen-holding gesture. This generates display instructions to display a simulated pen between the user's fingers, which the user may then use on the simulated drawing pad to make markings.

The figures depict embodiments of the present disclosure for purposes of illustration only. One skilled in the art will readily recognize from the following description that alternative embodiments of the structures and methods illustrated herein may be employed without departing from the principles of the disclosure described herein.

DETAILED DESCRIPTION

System Overview

Figure 1:
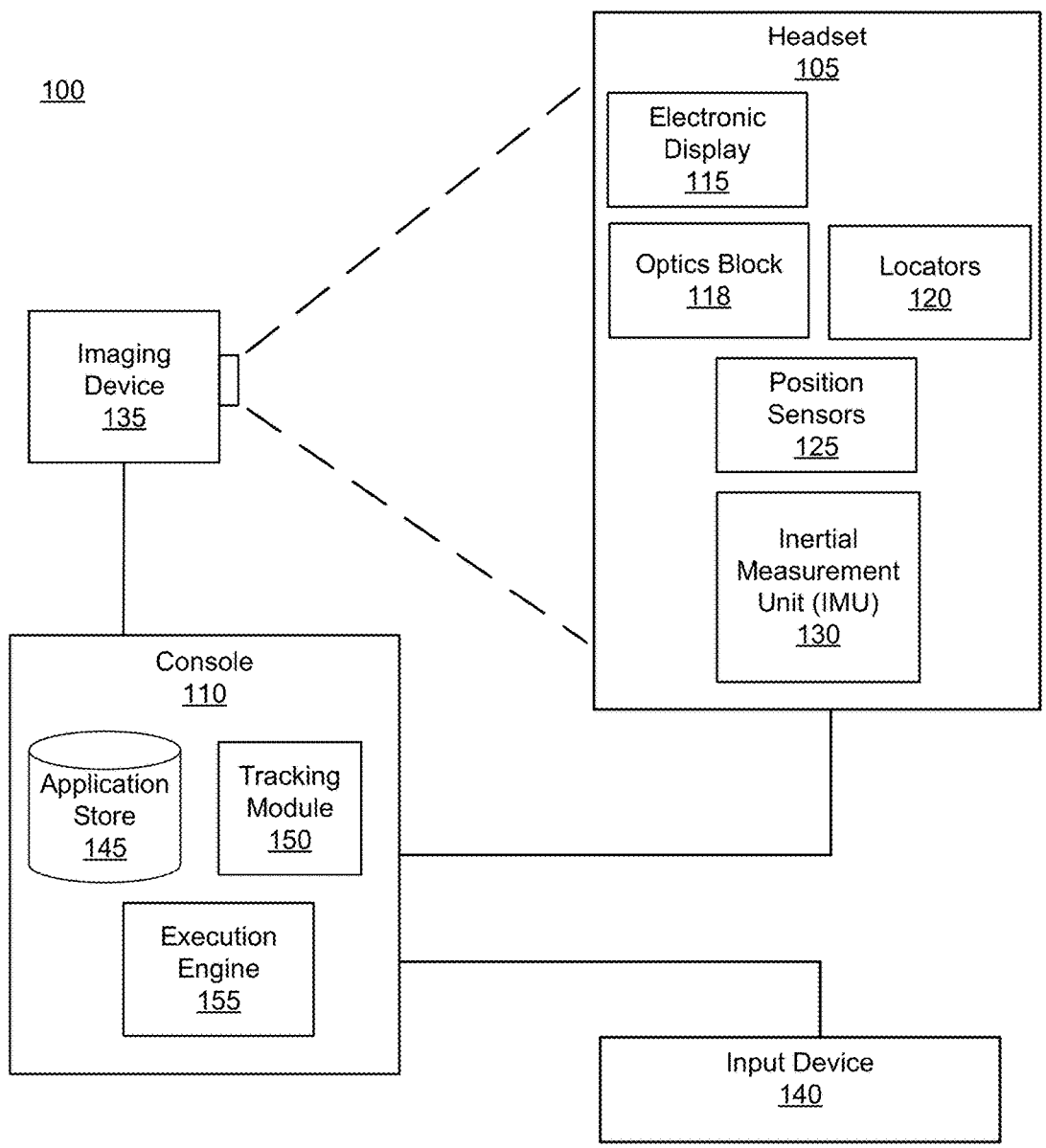
FIG. 1 is a block diagram of a virtual reality (VR), augmented reality (AR), and/or mixed reality (MR) system environment in which a console operates.

FIG. 1 is a block diagram of a virtual reality (VR), augmented reality (AR), and/or mixed reality (MR) system environment 100 in which a console 110 operates. The system environment 100 shown by FIG. 1 comprises a headset 105, an imaging device 135, and an input device 140 that are each coupled to the console 110. While FIG. 1 shows an example system 100 including one headset 105, one imaging device 135, and one input device 140, in other embodiments any number of these components may be included in the system 100. For example, there may be multiple headsets 105 each having an associated input device 140 and monitored by one or more imaging devices 135, with each headset 105, input device 140, and imaging device 135 communicating with the console 110. In alternative configurations, different and/or additional components may be included in the system environment 100. Similarly, functionality of one or more of the components may be distributed among the components in a different manner than is described here. For example, some or all of the functionality of the console 110 may be contained within the headset 105.

The headset 105 is a head-mounted display (HMD) that presents content to a user. Examples of content presented by the headset 105 include one or more images, video, audio, or some combination thereof. In some embodiments, audio is presented via an external device (e.g., speakers and/or headphones) that receives audio information from the headset 105, the console 110, or both, and presents audio data based on the audio information. The headset 105 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other. In some embodiments, the headset 105 may also act as an augmented reality (AR) headset. In these embodiments, the headset 105 augments views and of a physical, real-world environment with computer-generated elements (e.g., images, video, sound, etc.).

The headset 105 includes an electronic display 115, an optics block 118, one or more locators 120, one or more position sensors 125, and an inertial measurement unit (IMU) 130. The electronic display 115 displays images to the user in accordance with data received from the console 110. In various embodiments, the electronic display 115 may comprise a single electronic display or multiple electronic displays (e.g., a display for each eye of a user). Examples of the electronic display 115 include: a liquid crystal display (LCD), an organic light emitting diode (OLED) display, an active-matrix organic light-emitting diode display (AMO-LED), some other display, or some combination thereof. The images displayed to the user may include a simulated environment as described in further detail below.

The optics block 118 magnifies image light received from the electronic display 115, corrects optical errors associated with the image light, and presents corrected image light to a user of the headset 105. In various embodiments, the optics block 118 includes one or more optical elements. Example optical elements include: an aperture, a Fresnel lens, a convex lens, a concave lens, a filter, or any other suitable optical element that affects the image light emitted from the electronic display 115. Moreover, the optics block 118 may include combinations of different optical elements. In some embodiments, one or more of the optical elements in the optics block 118 may have one or more coatings, such as anti-reflective coatings.

Magnification of the image light by the optics block 118 allows the electronic display 115 to be physically smaller, weigh less, and consume less power than larger displays. Additionally, magnification may increase a field of view of the displayed media. For example, the field of view of the displayed media is such that the displayed media is presented using almost all (e.g., 110 degrees diagonal), and in some cases all, of the user's field of view. In some embodiments, the optics block 118 is designed so its effective focal length is larger than the spacing to the electronic display 115, which magnifies the image light projected by the electronic display 115. Additionally, in some embodiments, the amount of magnification may be adjusted by adding or removing optical elements from the optics block 118.

The optics block 118 may be designed to correct one or more types of optical error. Examples of optical error include: two dimensional optical errors, three dimensional optical errors, or some combination thereof. Two dimensional errors are optical aberrations that occur in two dimensions. Example types of two dimensional errors include: barrel distortion, pincushion distortion, longitudinal chromatic aberration, transverse chromatic aberration, or any other type of two-dimensional optical error. Three dimensional errors are optical errors that occur in three dimensions. Example types of three dimensional errors include spherical aberration, chromatic aberration, field curvature, astigmatism, or any other type of three-dimensional optical error. In some embodiments, content provided to the electronic display 115 for display is pre-distorted, and the optics block 118 corrects the distortion when it receives image light from the electronic display 115 generated based on the content.

The locators 120 are objects located in specific positions on the headset 105 relative to one another and relative to a specific reference point on the headset 105. A locator 120 may be a light emitting diode (LED), a corner cube reflector, a reflective marker, a type of light source that provides illumination to provide visual contrast the environment in which the headset 105 operates, or some combination thereof. Such a light source may be, e.g., a photodiode, a laser, some other device that provides light to the display object, or some combination thereof.

In embodiments where the locators 120 are active (i.e., an LED or other type of light emitting device), the locators 120 may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

In some embodiments, the locators 120 are located beneath an outer surface of the headset 105, which is transparent to the wavelengths of light emitted or reflected by the locators 120 or is thin enough not to substantially attenuate the wavelengths of light emitted or reflected by the locators 120. Additionally, in some embodiments, the outer surface or other portions of the headset 105 are opaque in the visible band of wavelengths of light. Thus, the locators 120 may emit light in the IR band under an outer surface that is transparent in the IR band but opaque in the visible band.

The IMU 130 is an electronic device that generates fast calibration data indicating an estimated position of the headset 105 relative to an initial position of the headset 105 based on measurement signals received from one or more of the position sensors 125. A position sensor 125 generates one or more measurement signals in response to motion of the headset 105. Examples of position sensors 125 include: one or more accelerometers, one or more gyroscopes, one or more magnetometers, another suitable type of sensor that detects motion, a type of sensor used for error correction of the IMU 130, or some combination thereof. The position sensors 125 may be located external to the IMU 130, internal to the IMU 130, or some combination thereof.

Based on the one or more measurement signals from one or more position sensors 125, the IMU 130 generates fast calibration data indicating an estimated position of the headset 105 relative to an initial position of the headset 105. For example, the position sensors 125 include multiple accelerometers to measure translational motion (forward/back, up/down, left/right) and multiple gyroscopes to measure rotational motion (e.g., pitch, yaw, roll). In some embodiments, the IMU 130 rapidly samples the measurement signals and calculates the estimated position of the headset 105 from the sampled data. For example, the IMU 130 integrates the measurement signals received from the accelerometers over time to estimate a velocity vector and integrates the velocity vector over time to determine an estimated position of a reference point on the headset 105. Alternatively, the IMU 130 provides the sampled measurement signals to the console 110, which determines the fast calibration data. The reference point is a point that may be used to describe the position of the headset 105. While the reference point may generally be defined as a point in space;

however, in practice the reference point is defined as a point within the headset 105 (e.g., a center of the IMU 130).

The IMU 130 receives one or more calibration parameters from the console 110. As further discussed below, the one or more calibration parameters are used to maintain tracking of the headset 105. Based on a received calibration parameter, the IMU 130 may adjust one or more IMU parameters (e.g., sample rate). In some embodiments, certain calibration parameters cause the IMU 130 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The imaging device 135 generates slow calibration data in accordance with calibration parameters received from the console 110. Slow calibration data includes one or more images showing observed positions of the locators 120 that are detectable by the imaging device 135. The imaging device 135 may include one or more cameras, one or more video cameras, any other device capable of capturing images including one or more of the locators 120, or some combination thereof. Additionally, the imaging device 135 may include one or more filters (e.g., used to increase signal to noise ratio). The imaging device 135 is configured to detect light emitted or reflected from locators 120 in a field of view of the imaging device 135. In embodiments where the locators 120 include passive elements (e.g., a retroreflector), the imaging device 135 may include a light source that illuminates some or all of the locators 120, which retro-reflect the light towards the light source in the imaging device 135. Slow calibration data is communicated from the imaging device 135 to the console 110, and the imaging device 135 receives one or more calibration parameters from the console 110 to adjust one or more imaging parameters (e.g., focal length, focus, frame rate, ISO, sensor temperature, shutter speed, aperture, etc.).

In one embodiment, the imaging device 135 may be used to capture a representation of the user's hands over time for tracking the user's hands (e.g., by capturing multiple images per second of the user's hand). To achieve a more accurate capture, the imaging device 135 may be able to capture depth data of the environment. This may be achieved by various means, such as by the use of computer vision algorithms that generate 3D data via detection of movement in the scene, by the emission of a grid pattern (e.g., via emission of an infrared laser grid) and detection of depth from the variations in the reflection from the grid pattern, from computation of time-of-flight of reflected radiation (e.g., emitted infrared radiation that is reflected), and/or from the user of multiple cameras (e.g., binocular vision/stereophotogrammetry). The imaging device 135 may be positioned to capture a large spatial area, such that all hand movements within the spatial area are captured. In one embodiment, more than one imaging device 135 is used to capture the user's hands.

The input device 140 is a device that allows a user to send action requests to the console 110. An action request is a request to perform a particular action. For example, an action request may be to start or to end an application or to perform a particular action within the application. An action request received by the input device 140 is communicated to the console 110, which performs an action corresponding to the action request. In some embodiments, the input device 140 is a tracking glove that tracks movement of a user's hand. In other embodiments, the input device 140 may be a device tracking movement of another other portion, or portions, of the user's body. Additionally, the input device 140 may provide haptic feedback to the user in accordance with instructions received from the console 110. For example, the input device 140 provides haptic feedback when an action request is received, or the console 110 communicates instructions to the input device 140 causing the input device 140 to generate haptic feedback when the console 110 performs an action.

In some embodiments, the input device 140 includes a set of locators similar to the locators 120 included in the headset 105, further described above. Locators included on the input device 140 may be imaged by the imaging device 135 to generate slow calibration data based on calibration parameters received from console 110, as described above regarding generation of slow calibration data from the locators 120 included on the headset 105. Slow calibration data includes one or more images showing observed positions of the locators included on input device 140 that are detectable by the imaging device 135. The locators on the input device 140 are located in specific positions on the input device 140 relative to one another and relative to a specific reference point on the input device 140. Similar to the locators 120 included on the headset 120 described above, locators on the input device 140 may be located on an outer surface of the input device 140 or beneath the outer surface of the input device 140, which is transparent to the wavelengths of light emitted or reflected by the locators included on the input device 140 or is thin enough not to substantially attenuate the wavelengths of light emitted or reflected by the locators included on the input device 140.

The console 110 provides content to the headset 105 for presentation to the user in accordance with information received from one or more of: the imaging device 135, the headset 105, and the input device 140. In the example shown in FIG. 1, the console 110 includes an application store 145, a tracking module 150, and an execution engine 155. Some embodiments of the console 110 have different modules than those described in conjunction with FIG. 1. Similarly, the functions further described below may be distributed among components of the console 110 in a different manner than is described here. For example, the functions of the tracking module 150 and execution engine 155 may be performed partially or wholly by the headset 105.

The application store 145 stores one or more applications for execution by the console 110. An application is a group of instructions that, when executed by a processor, generates content for presentation to the user. Content generated by an application may be in response to inputs received from the user via movement of the headset 105 or the VR interface device 140. Examples of applications include: gaming applications, conferencing applications, video playback application, or other suitable applications.

The tracking module 150 calibrates the system environment 100 using one or more calibration parameters and may adjust one or more calibration parameters to reduce error in determining of the position of the headset 105 or of the input device 140. For example, the tracking module 150 adjusts the focus of the imaging device 135 to obtain a more accurate position for observed locators on the headset 105 or on the input device 140. Moreover, calibration performed by the tracking module 150 also accounts for information received from the IMU 130 or the control module 144. Additionally, if tracking of the headset 105 is lost (e.g., the imaging device 135 loses line of sight of at least a threshold number of the locators 120 on the headset 105), or tracking of the input device 140 is lost (e.g., the imaging device 135 loses line of sight of at least a threshold number of locators on the input device 140), the tracking module 150 re-calibrates some or all of the system environment 100.

The tracking module 150 tracks movements of the headset 105 or of the input device 140 using slow calibration information from the imaging device 135. For example, the tracking module 150 determines positions of a reference point of the headset 105 or of the input device 140 using observed locators on the headset 105 or on the input device 140, respectively, from the slow calibration information and a model of the headset 105 or a model of the input device 140, respectively. The tracking module 150 determines positions of a reference point of the headset 105 using position information from the fast calibration information. Additionally, the tracking module 150 determines positions of an alignment point of the input device 140 using position information received from the input device 140. Additionally, in some embodiments, the tracking module 150 may use portions of the fast calibration information, the slow calibration information, or some combination thereof, to predict a future location of the headset 105. Similarly, the tracking module 150 may use portions of the slow calibration data, the position information from the input device 140, or some combination thereof, to predict a future location of the input device 140.

In one embodiment, the tracking module 150 is used to track movement of the digits of the user's hands and the hands themselves in order to recognize various poses for the user's hand. Each pose indicates a position of a user's hand. By detecting a combination of multiple poses over time, the tracking module 150 is able to determine a gesture for the user's hand. These gestures may in turn translate into various inputs to the system. For example, a movement using a single digit in one direction may translate into a button press input in the system.

In one embodiment, the tracking module 150 uses a deep learning model to determine the poses of the user's hands. The deep learning model may be a neural network, such as a convolutional neural network, or more specifically a residual neural network. The neural network may take as input feature data extracted from raw data from the imaging device 135 of the hand, e.g., depth information of the user's hand, or data regarding the location of locators on any input device 140 worn on the user's hands. The neural network may output the most likely pose that the user's hands are in. Alternatively, the neural network may output an indication of the most likely positions of the joints of the user's hands. The joints are positions of the user's hand, and may correspond to the actual physical joints in the user's hand, as well as other points on the user's hand that may be needed to sufficiently reproduce the motion of the user's hand in a simulation.

If the neural network outputs the positions of joints, the tracking module 150 additionally converts the joint data into a pose, e.g., using inverse kinematics principles. For example, the position of various joints of a user's hand, along with the natural and known restrictions (e.g., angular, length, etc.) of joint and bone positions of the user's hand allow the tracking module 150 to use inverse kinematics to determine a most likely pose of the user's hand based on the joint information. The pose data may also include an approximate structure of the user's hand, e.g., in the form of a skeleton, point mesh, or other format.

The neural network is trained using training data. In one embodiment, the training data is generated from a multiple camera array, such as multiple imaging devices 135, that capture hand movements in different poses with different hands from different users, and/or the locators on input devices 140 worn by the different hands. The ground truth for this training data indicates joint positions and/or poses for the hands, and may be generated using human verification.

An additional neural network may be used by the tracking module 150 to determine a gesture from a particular pose. Such a neural network may be similarly trained, using as input data computed poses (or joints) and with output data indicating the most likely gesture. Other methods may be used by the tracking module 150 to determine the gesture from the post, such as a measurement of the distances and positions between the digits of the hand and the positions of the hand in 3D space. If these distances and positions fall within certain thresholds, the tracking module 150 may indicate the likelihood of a gesture.

Using such a method, the tracking module 150 is able to determine the likely poses of a user's hands, and with the determination of the poses, the tracking module 150 may be able to match the movement of the user's hands with predefined gestures. These gestures may be used to perform various actions in the simulated environment generated by the system.

Additional details regarding the tracking and determination of hand positions using imaging devices and input devices are described in U.S. application Ser. No. 15/288,453, filed Oct. 7, 2016, and U.S. App. No. 62/401,090, filed Sep. 28, 2016, both of which are incorporated by reference in their entirety.

The execution engine 155 executes applications within the system environment 100 and receives position information, acceleration information, velocity information, predicted future positions, or some combination thereof, from the headset 105 or the input device 140 from the tracking module 150. Based on the received information, the execution engine 155 determines content to provide to the headset 105 for presentation to the user. For example, if the received information indicates that the user has looked to the left, the execution engine 155 generates content for the headset 105 that mirrors the user's movement in a virtual environment. Similarly, if information received from the input device 140 indicates the user's hand makes a thumbs-up gesture, the execution engine 155 generates content based on the identified thumbs-up gesture, such as a visual representation of a hand making a thumbs-up gesture for presentation by the headset 105.

Additionally, in some embodiments, if the received information indicates that the input device 140 detaches or slips from the user's hand, the execution engine 155 generates content indicating the input device 140 has lost contact with the user's hand for presentation by the headset 105. Additionally, the execution engine 155 performs an action within an application executing on the console 110 in response to an action request received from the input device 140 and provides feedback to the user that the action was performed. The provided feedback may be visual or audible feedback via the headset 105. For example, the execution engine 155 receives an action from the input device 140 to open an application, so the execution engine 155 opens the application and presents content from the application to the user via the headset 105.

In one embodiment, the execution engine 155 determines the current pose of the user's hand based on raw joint data received from the tracking module 150. In another embodiment, the execution engine 155 detects the gestures of the user's hand based on the pose data. The methods in which the execution engine 155 determines poses and gestures is similar to the methods described above for the tracking module 150.

In addition to determining the current pose of the user's hand(s), the execution engine 155 also provides output to the electronic display 115 in accordance with a set of display instructions (e.g., pixel data, vector data, etc.). This output to the electronic display 155 may include a virtual recreation (using computer graphics) of the user's hands, as well as other objects (virtual or otherwise), such as a drawing pad, keyboard, virtual user interface, recreation of a physical object, and so on. Examples of such virtual recreations are shown below in FIGS. 2-8. Virtual objects rendered by the electronic display 155 may be referred to as simulated objects or elements.

Additional details regarding possible poses and gestures are described below with reference to FIGS. 2-9.

Example Pen-Holding Gesture Tracked in a VR/AR/MR Environment

Figure 2A:
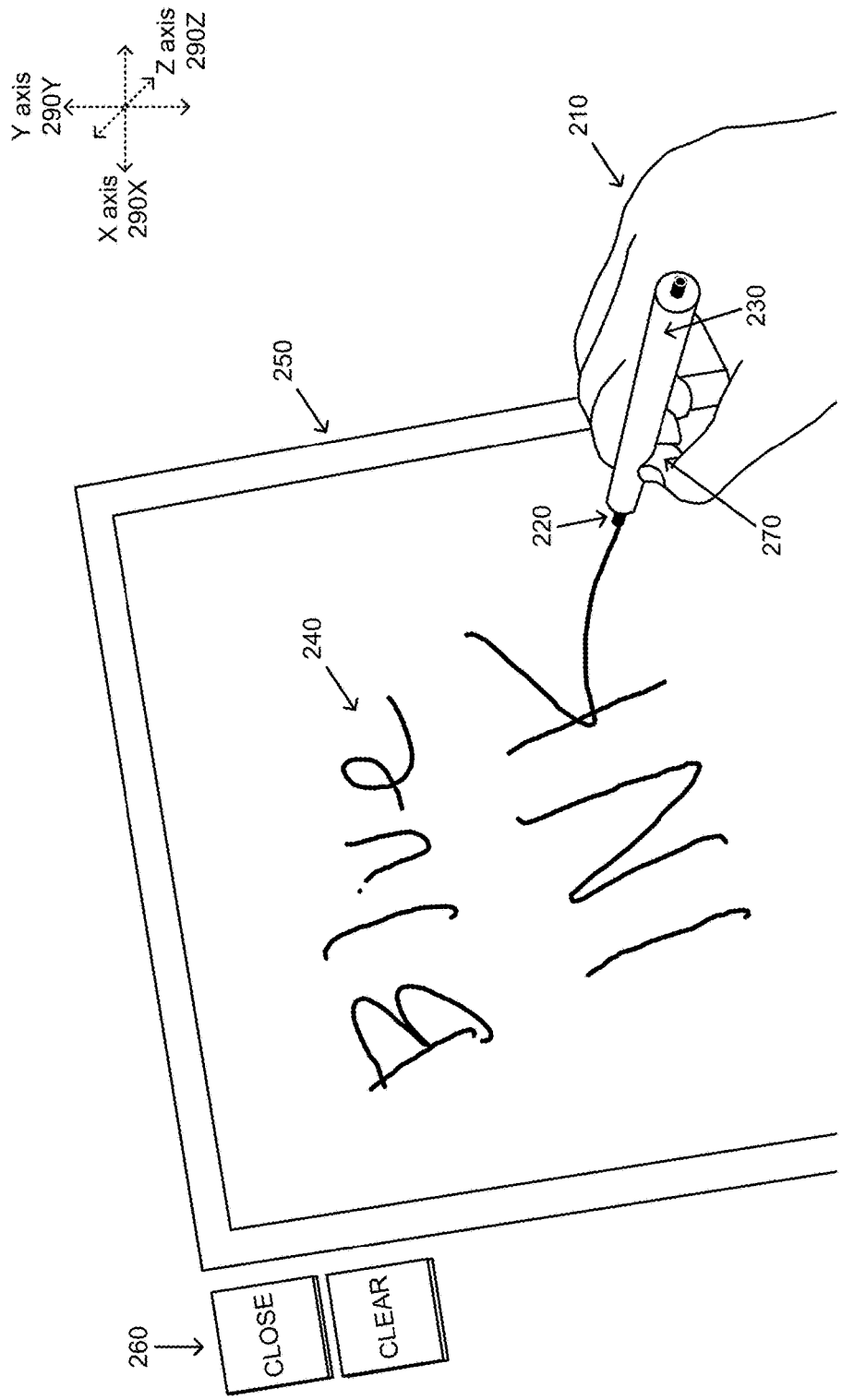
FIG. 2A illustrates an exemplary pinching pose that causes the system to detect a pen-holding gesture, according to one embodiment.

FIG. 2A illustrates an exemplary pinching pose that causes the system to detect a pen-holding gesture, according to one embodiment. A pen holding gesture is a gesture that indicates that the user is holding a marking instrument in the simulated environment, and is indicated when a user's hand (e.g., the user's dominant hand) is in a pose for holding the marking instrument, such as a pen, pencil, marker, etc. In particular, in this pose, two or more opposing fingers of the user's hand are in a pose for holding the marking instrument, which can be simulated or may exist in reality. In this figure and the figures below, the hand 210 represents both the user's actual hand and a simulation of the user's hand in the simulated environment which may be presented to the user via the electronic display 115. The other elements in may be simulated.

If the console 110 (e.g., the tracking module 150 in the console 110) detects poses in the user's hand 210 indicating a pen-holding gesture, the console 110 may indicate to a running application that the user has initiated a pen gesture. Alternatively, the console 110 may itself generate a simulated pen. As a result, as shown in FIG. 2A, the simulated environment includes the simulated pen 230 for the user to utilize. For example, the simulated pen 230 may have a simulated inking component 220 with which the user may perform simulated writing 240 on a simulated drawing pad 250, when the user causes the simulated inking component 220 to make contact with the simulated drawing pad 250 in the simulated environment.

The console 110 may detect the pen-holding gesture when the console 110 detects a pose of the user's hand 210 (which may be left or right) indicating a minimum and maximum separation distance between the user's thumb and index digits (indicated at 270). For example, this distance may be that of the width of an average-sized pen, measured from the distal end of the user's thumb to the distal end of the user's index finger. The console 110 may further determine that the distal portion of the thumb should be directed orthogonally or near-orthogonally (within a minimum degree) to the lateral surface of the index finger. The console 110 may further determine that the pose is being performed by the user's dominant hand. The console may further determine that the other fingers of the user's hand are generally parallel (within a certain degree) to the user's index finger.

The console 110 may also be configured to detect other poses of the user's hand as a pen-holding gesture. For example, the console may detect a pen-holding gesture when the thumb, index, and middle fingers of the user's hand 210 are within a minimum and maximum (e.g., a specified range) of separation distances. In one instance, the console 110 may receive a custom pose designed by the user indicating that such a pose is a pen-holding gesture (e.g., via the use of a pose input interface). The console 110 may determine that the pose does not conflict with any other gestures stored by the console 110 and add this pose to the types of detected pen-holding gestures, or replace the existing pen-holding gestures with this custom pose.

In one embodiment, the user is holding an actual physical pen (or pen shaped object). The physical pen may include various sensors, such as an IMU, and may transmit its location in 3D space to the console 110, or alternatively the console may detect the position of the pen in a similar fashion to how the console 110 might detect the position of the user's hand 210 or the input device 140. When the user grabs onto the physical pen, and when the console 110 detects a pen-holding gesture, the console 110 may simulate the pen in the simulated environment as shown in FIG. 2A. The simulated pen mirrors the relative position of the actual physical pen relative to the user's hand.

In one embodiment, after the console 110 detects the pen holding gesture, the console 110 may also determine a difference in the width of the inked line from the simulated pen by a distance from the user's hand to the drawing pad, or by a distance between the user's index finger and thumb. This may allow the console 110 to simulate pen pressure.

Additionally, the user has the option to interact with the buttons 260, labeled "CLOSE" and "CLEAR." Interacting with the "CLOSE" button may close the drawing pad 250 in the simulated environment. Interacting with the "CLEAR" button may clear the simulated writing 240 on the drawing pad 250. The interaction may be performed by interacting the simulated pen 230 with the button as well. Additional details regarding interacting with button elements are described below.

Figure 2B:
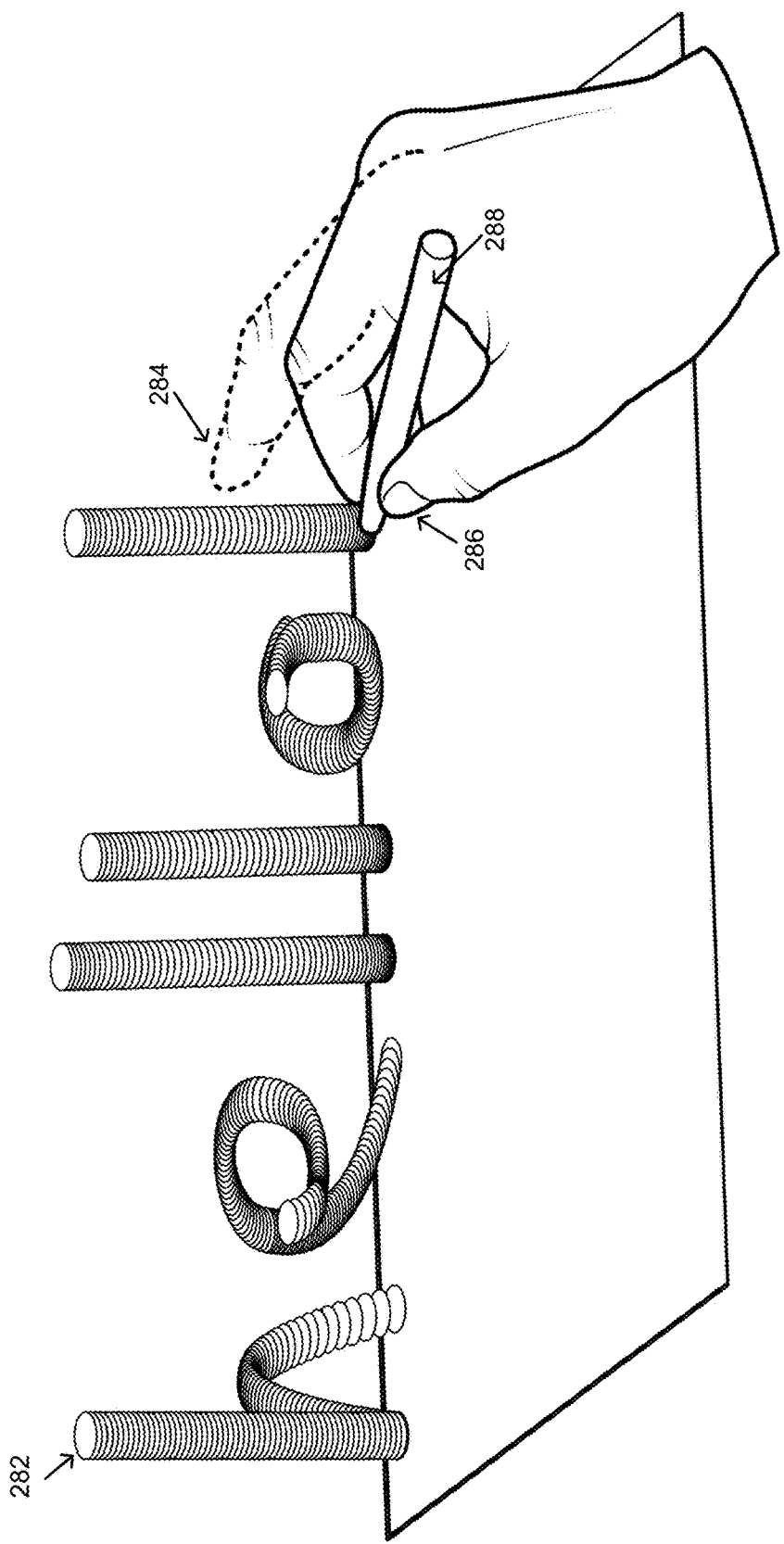
FIG. 2B illustrates another exemplary pinching pose that causes the system to detect a pen-holding gesture for writing in three dimensions, according to one embodiment.

FIG. 2B illustrates another exemplary pinching pose that causes the system to detect a pen-holding gesture for writing in three dimensions, according to one embodiment.

As shown in FIG. 2B, if the console 110 detects a pen-holding gesture, instead of the simulated writing 240 on a two-dimensional drawing pad 250 as shown in FIG. 2A, the console 110 may draw a three-dimensional (3D) simulated writing or drawing 282 as shown in FIG. 2B. The console 110 may detect the pen-holding gesture in much the same way, by detecting the index finger 284 moving within a threshold distance to the thumb 286, causing the console 110 to simulate a pen 288 in the simulated environment, and to respond by presenting the simulated writing or drawing 282 to the user at the positions occupied by the simulated pen 288 over time.

The console 110 may update the simulated environment at a set frequency and add a 3D object, such a point sprite, 3D sphere, or other object, at the point indicated by the tip of the simulated pen 288 in 3D space at each update. The tip of the simulated pen 288 moves in accordance to the position of the user's hand and the user's thumb 286 and index finger 284. The console 110 may detect the overall shape and position of the user's hand, and present the simulated pen 288 in a default position according to landmarks on the user's hand, such as the center of the opening between the user's thumb and index fingers as one landmark, and the point bisecting the tip of the user's thumb 286 and index finger 284 as the second landmark. The console 110 may simulate the pen 288 passing through these landmarks, and can thus determine the three dimensional location of the tip of the simulated pen 288, and thus where to place the simulated writing or drawing 282.

In one embodiment, the console 110 simulates the writing or drawing when both the index finger 284 and the middle finger (not shown) are within a threshold distance of the user's thumb 286. However, when only the middle finger and thumb 286 are within the minimum distance, the console 110 only simulates the holding of the pen, but does not simulate any writing or drawing, as described above.

In another embodiment, the console 110, upon detecting a minimum separation distance between the user's thumb and the user's index finger and middle finger, "holsters," or moves the simulated pen 288 to a position alongside the wrist of the user's non-dominant hand. The console 110 tracks the user's non-dominant hand and moves the simulated pen 288 relative to the non-dominant hand while in this holstered mode. Alternatively, the user can move the pen to this location by moving his or her dominant hand near this wrist location. The console 110 may further detect the user using a pinch gesture against this holstered simulated pen 288, at which point the console 110 simulates the simulated pen 288 being held by the user's dominant hand.

Example Contextual Menu Gesture Tracked in a VR/AR/MR Environment

Figure 3:
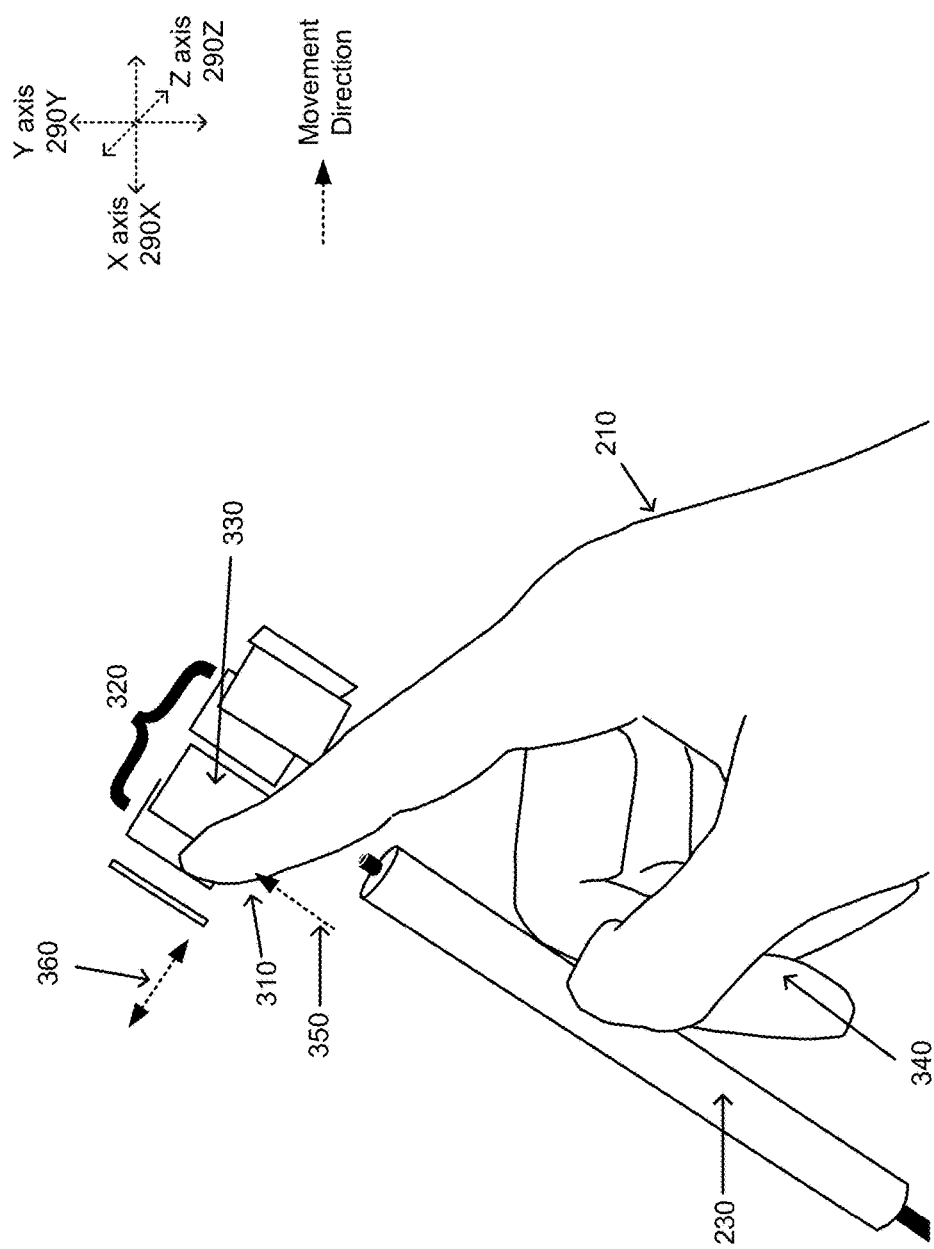
FIG. 3 illustrates an exemplary release pose that causes the system to simulate a contextual menu, according to one embodiment.

FIG. 3 illustrates an exemplary release pose that causes the system to simulate a contextual menu, according to one embodiment.

In the simulated environment shown in FIG. 3, the console 110 has detected a pose where the user's hand 210 has released the contact with the simulated pen 230 described above with reference to FIG. 2A. As shown at point 340, the console 110 may detect a pose in the user's hand 210 where the separation between the user's thumb and index finger exceeds a maximum threshold distance (or the minimum threshold distance described above), as measured from the distal ends of the user's thumb and index fingers. In such a scenario, the console 110 may simulate (or indicate to an associated application to simulate) the simulated pen 230 in a stationary (i.e., no longer moving) position. In this scenario, the console 110 also detects a contextual menu gesture in response this change in the user's pose occurring after the user had executed a pen-holding gesture. A contextual menu gesture indicates that a contextual menu should be simulated in the simulated environment, and is indicated when the user changes the pose of the user's hand from the pose of the pen-holding gesture. In response to detecting this contextual menu gesture, the console 110 may simulate a contextual menu 320 as shown. The contextual menu may have selectable options, such as the option 330, which in the illustrated example is a simulated rectangle. The selectable options may include different colors, font selections, line thickness, eraser options, and any other contextual options that may be used for a pen.

The simulated contextual menu 320 has selectable options arranged in a carousel structure in the 3D space of the simulated environment. The user may be able to rotate the carousel using a motion in the X and Y axes as shown with movement direction 360. When the console 110 detects this movement, which is in a direction orthogonal to the central axis of the carousel, the console 110 may rotate the positions of the options in the simulated contextual menu 320, with the rotation direction according to the movement direction 360.

The console 110 may also detect a selection of one of the options in the simulated contextual menu 320. For example, in the illustrated figure, the user's index finger is selecting the option 330 (which may represent a different simulated inking color for the pen) at location 310, which is completed by a movement direction 350 along the Z and X axes (e.g., "into" the plane of the figure), and which is orthogonal to the plane represented by the rectangle that is the option 330. When the console 110 detects such a change in pose of the user's index finger by a certain threshold distance, the console 110 may register the selection of the option 330, and perform (or instruct any application to perform) the actions or executable code corresponding to the option 330. For example, if the option 330 were a color, then the console 110 may change the inking color of the pen 230. This might be visually represented by simulating the color corresponding to the color of option 330 at the tip of the simulated pen 230.

In one embodiment, the contextual menu gesture is only detected when user has not placed the simulated pen at a resting location, e.g., on a simulated table top. Furthermore, although a contextual menu is shown here in relationship to a pen, in other cases, the same gesture may cause the console 110 to simulate a contextual menu in a different context (e.g., with a different object), and the contextual menu would have different options. Also, as noted above, the simulated pen 230, may in some cases, be represented by a physical pen the real world. In such a case, the simulated contextual menu 320 may also be activated by a press of a button located on the physical pen. Alternatively, the user may be able to release the physical pen (e.g., on a resting location) to activate the simulated contextual menu 320.

Example Button Press Gesture Tracked in a VR/AR/MR Environment

Figure 4:
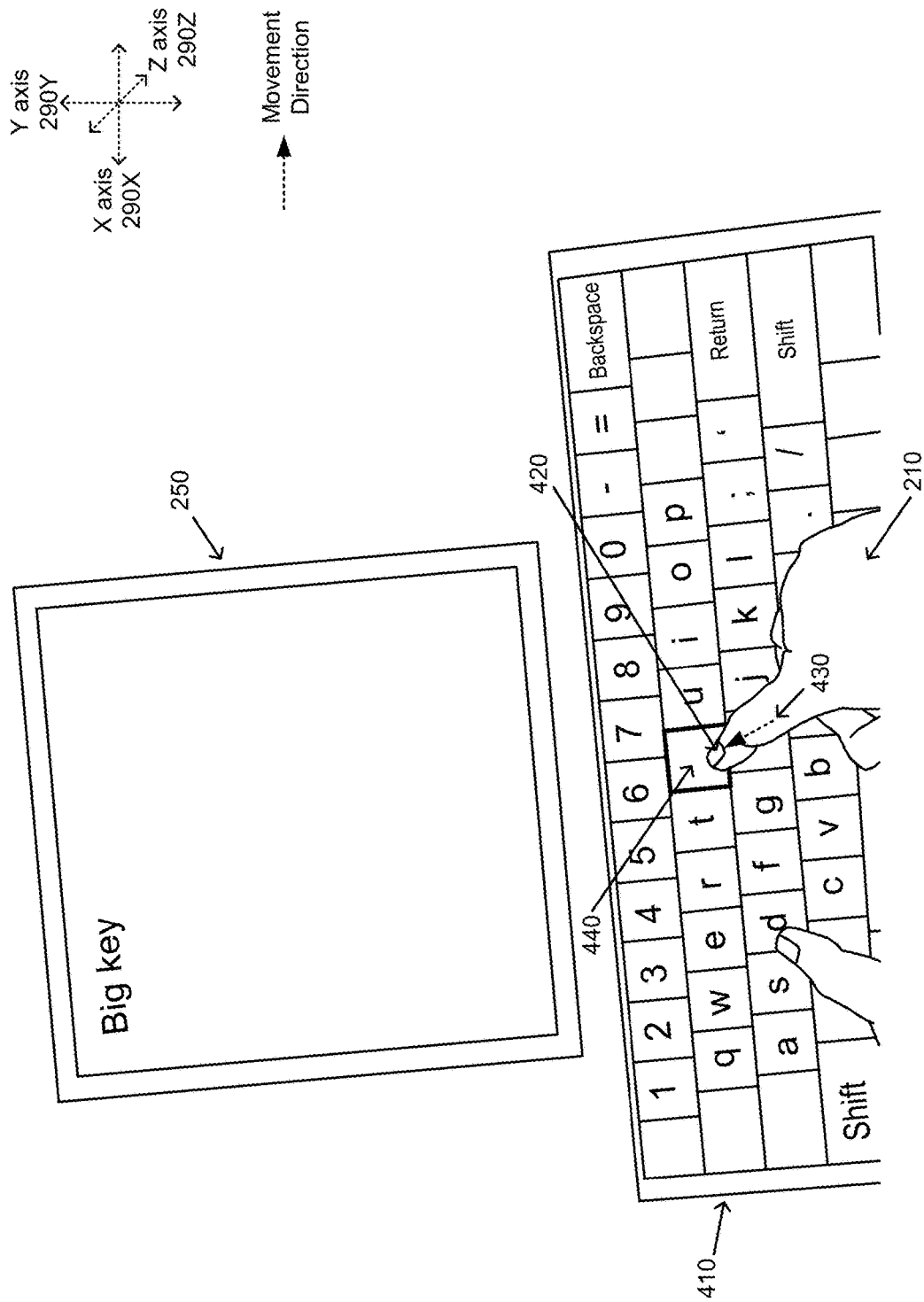
FIG. 4 illustrates finger movement causing the system to detect a button press gesture, according to one embodiment.

FIG. 4 illustrates finger movement causing the system to detect a button press gesture, according to one embodiment. A button press gesture indicates that a user has pressed a simulated button in the simulated environment, and is indicated when the user's hand interacts in a direction that is within a maximum angle to the normal of the simulated button in the simulated environment.

In one embodiment, the console 110 detects a change in pose of the user's finger 420. The console 110 detects a translational movement in the user's finger in one movement direction 430. The console 110 may also detect that the finger is elongated. If the console 110 also detects an intersection (or a minimum distance) between the position of the distal portion of the finger in the simulated environment and a pressable element in the simulated environment, the console 110 may register a button press gesture. The button press gesture may cause the console 110 to activate or execute any action associated with the pressable element. In the illustrated example, the simulated keyboard 410 represents a computer keyboard (e.g., with a QWERTY layout). The simulated keyboard 410 has multiple keys, such as the simulated key 440. These keys may mirror the layout on a real computer keyboard. The simulated keyboard 410 may be activated for display by the console 110 in the simulated environment in response to a selection in a contextual menu, or via a button press gesture with a simulated button in the simulated environment. In the illustrated example, the finger 420 intersects the simulated key 440 on the simulated keyboard 410. This causes the letter corresponding to the pressed key to appear on the drawing pad 250. Note the movement direction 430 here is along the Z axis. Note that although the index finger for the user is shown here intersecting with simulated keys on the simulated keyboard 410, the console 110 can detect intersections between the other fingers of the user with the simulated keys on the simulated keyboard 410, and register these as button press gestures with the respective simulated keys. In this way, the console 110 may simulate the process of typing on a computer keyboard within the simulated environment.

In one embodiment, the console 110 also detects a button press gesture using more than one finger. For example, the user may use two fingers to press a simulated pressable element. This may cause the console 110 to perform a different action compared to the single finger press. Alternatively, the console 110 may perform different actions when detecting a button press from different digits of the user's hand 210. For example, a button press gesture using the user's thumb may activate a user authentication procedure.

The button press gesture may be followed by poses indicating a translational movement of the user's finger 420 or fingers in a direction orthogonal to the direction of the movement direction 430 used to generate the button press gesture. If the console 110 detects such a change in pose, the console 110 may detect a sliding gesture. This may cause the console 110 to perform a related action that is defined for the pressable element, such as swiping away a display element, and so on. If two of these sliding gestures are detected, the console 110 may perform a different action, such as zooming in on a simulated element. Alternatively, this sliding gesture may cause an element in the simulated environment to be scrolled.

Example Scrolling Gestures Tracked in a VR/AR/MR Environment

Figure 5:
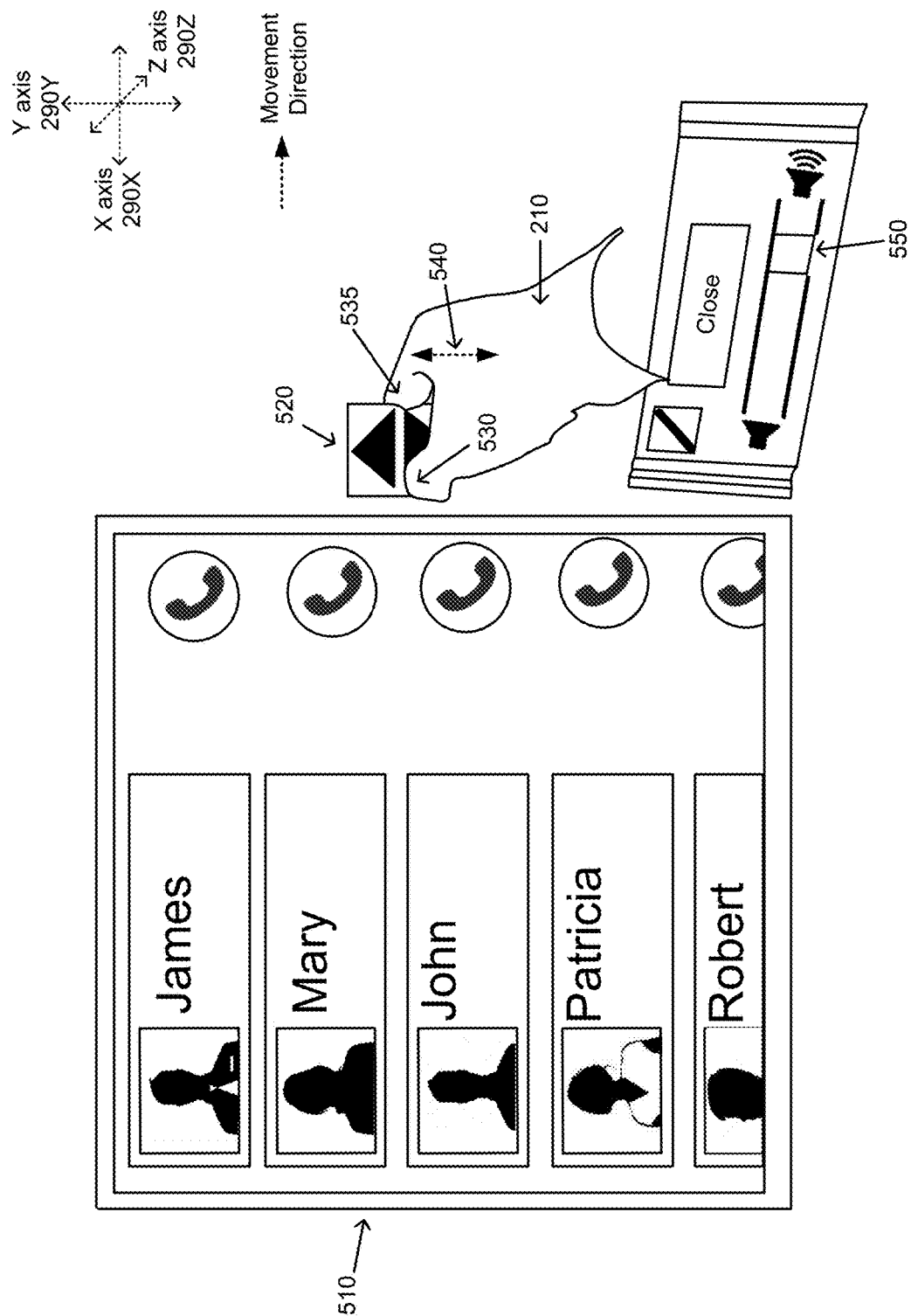
FIG. 5 illustrates sliding movements causing the system to detect scrolling gestures, according to one embodiment.

FIG. 5 illustrates sliding movements causing the system to detect scrolling gestures, according to one embodiment. A scrolling gesture indicates that a simulated element in the simulated environment should be translated in at least one direction (i.e., "scrolled") and is indicated when a user's hand interacts with a simulated scrolling element in a direction within a maximum angle to the specified direction of scroll of the simulated scrolling element. The direction of scroll is the same as the direction in which the simulated element would be translated if the simulated scrolling element is interacted with by the user in the scrolling gesture.

In one embodiment, the console 110 detects a change in pose of the user's index finger and thumb such that the distal ends of the index finger and thumb (as shown at 530 and 535, respectively) are within a threshold separation distance (e.g., 5 mm and/or touching each other). This is a pinch gesture. A pinch gesture is when a user performs a pinching pose with opposable fingers of the user's hand against a simulated element in the simulated environment. Furthermore, the console 110 detects that the user's hand translates in a movement direction along a straight line (or roughly a straight line). This is a pinch scroll gesture. A pinch scroll gesture is a scrolling gesture where the interaction of the user's hand with the simulated scrolling element is in the pose of a pinch. If the distal ends of the index and thumb surround a simulated scrolling element in the simulated environment, and the movement direction is parallel (or substantially parallel) to the scroll direction of the scrolling element, the console 110 may cause a scroll action to occur in the simulated element associated with the scrolling element. Additionally, the scrolling element may move along a guided path as a visual feedback to the pinch scroll gesture. For example, in the illustrated example, the hand 210 pinches the scroll element 520 at 530 and moves in the movement direction 540 (e.g., on an axis parallel to the Y axis). This is detected by the console 110 as a pinch scroll gesture and causes the console to scroll the scrollable display element 510 that contains an address book. The scrolling element 520 also moves along with the user's hand such that the position of the scrolling element 520 does not change relative to the position of the user's hand in the axis of the scroll.

In one embodiment, if the console 110 detects a pinch scroll gesture with the thumb and two fingers (e.g., the index and middle fingers), the console 110 may speed up the rate of the scroll action compared to the scroll action with just the one finger. Similarly, if after detecting the pinch scroll gesture, the console 110 detects a change in pose of the user's hand where the distance between the scrolling element 520 and the user's hand increases while the user's hand is still in the "pinched" position, the console 110 may also increase the rate of scrolling.

In addition to the pinch scroll, the console 110 may also detect a push scroll gesture. A push scroll gesture is a scrolling gesture where the user's interaction with the simulated scrolling element includes a button press gesture. As described above, a user may perform a button press gesture, and then translate the user's finger orthogonal to the movement direction of the button press gesture. This may cause a scroll or sliding element in the simulated environment to move along a guided path. For example, the console 110 may detect a button press gesture against the slider element 550 in the simulated environment as illustrated, and further detect a translational movement of the user's finger along the guided path of the slider element 550. In this case, this would case a change in the volume. Note that the slider element 550 may be interacted with using the simulated pen 230 as well to produce the same effect.

Note the other elements that the user may interact with in the simulated environment as illustrated, including the call buttons, "close" button, and so on.

Example Transform Gestures Tracked in a VR/AR/MR Environment

Figure 6:
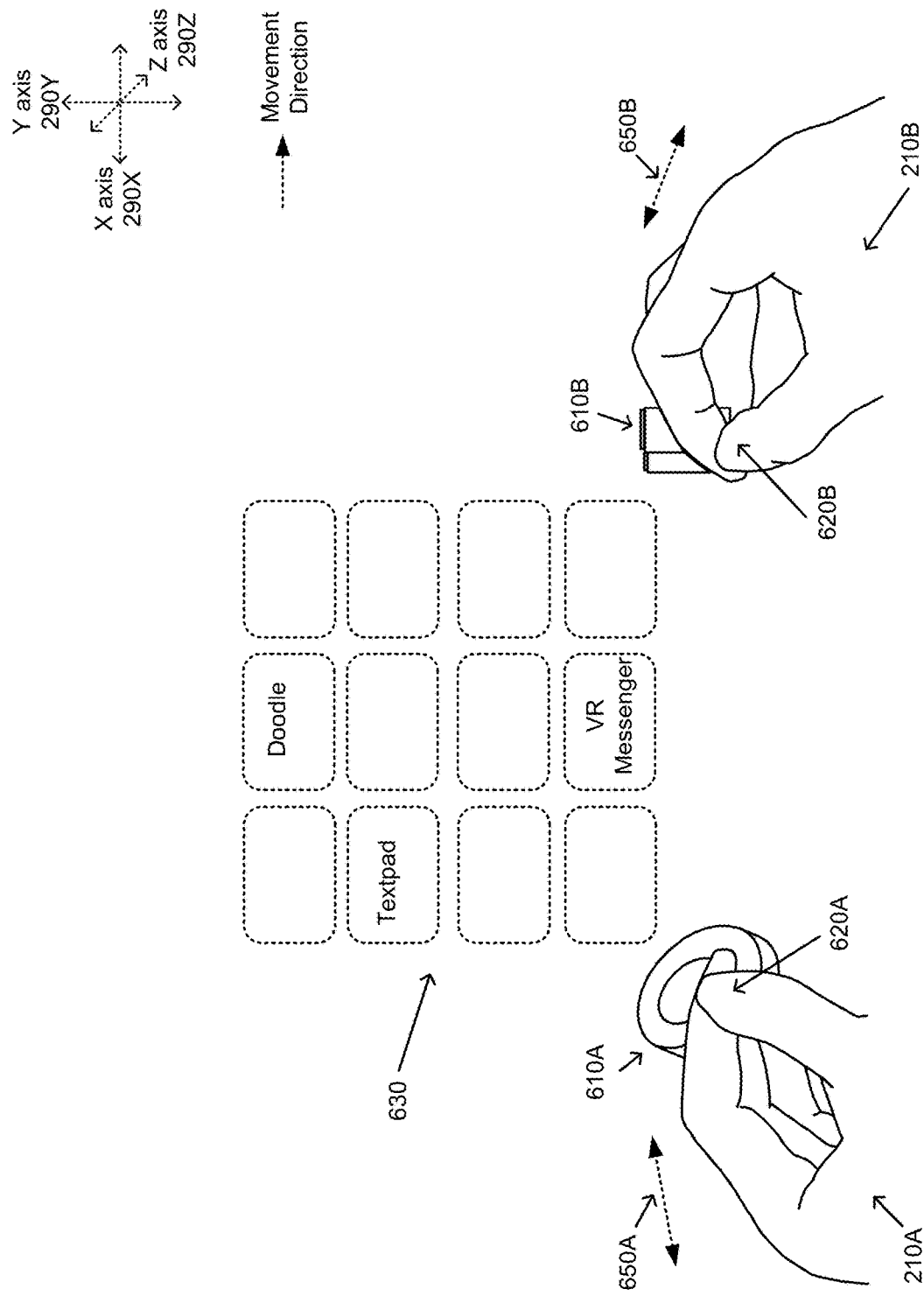
FIG. 6 illustrates two hand movements causing the system to detect a transform gesture, according to one embodiment.

FIG. 6 illustrates two hand movements causing the system to detect a transform gesture, according to one embodiment.

In one embodiment, the console 110 detects a change in pose of both hands of the user. The console 110 detects a pinch gesture (as described above) in both of the user's hands. The console 110 also detects movement in both hands. The simultaneous movement of the hands is a transform gesture. The transform gesture is indicated when a user performs a pinch gesture with both hands on two different areas in a simulated element and translates both hands simultaneously in two directions, causing the simulated element to transform according to the two directions. If the pinch gesture in both hands each surround a transform element of a simulated element in the simulated environment, the console 110 responds by causing a transform action to occur on the simulated element based on the movement of the hands. The transform element is simulated interface component of any shape that is visible to the user in the simulated environment, that the user may interact with using the pinch gesture. The shape of all transform elements may be similar across all simulated elements in the simulated environment. In the example of FIG. 6, the transform elements 610 may be represented by cylindrical shapes, with left and right transform elements 610 appearing as different orientations and sizes of the same cylindrical shape. The transform action is a change in dimensions and/or position of the simulated element.

If the hands are moving apart from each other, the transform action may be an enlargement or size increase of the simulated element. If the hands are moving closer together, the transform action may be a shrinking or size decrease of the simulated element. If the hands are moving in opposite directions to each other around the simulated element, the transform action may be a rotation of the simulated element. If the hands move together and the distance between the hands do not change beyond a threshold value, the transform action may be a move of the simulated element. In all cases, the console 110 may ensure the distance between the simulated element and its transform elements are kept at a constant, or that the distance changes as little as possible given the dimensional constraints of the simulated element. Note that the transform elements in this case follow the user's hands (i.e., are "attached" to the user's hands).

In the illustrated example, the two hands are the hands 210A and 210B, the simulated element is a button pad 630, the transform elements are the transform elements 610A and 610B, and the hands may be moving apart or closer together according to the movement directions 650A and 650B. If the hands 210 are moving apart, the simulated button pad 630 increases in size in the simulated environment. If the hands 210 are moving closer, the simulated button pad 630 decreases in size. The rate of change in the transform may depend on the rate of change of the distance between the hands. In some embodiments, the console 110 may detect a pinch rotation gesture when the user interacts with this transform element 610A individually (without the other hand) and changes the pose of the hand by rotating it about an axis. This may cause the console 110 to rotate the simulated element around the same axis as well.

Note that the labels on the buttons in the figure are exemplary, and in other embodiments the buttons may be labeled with other text, and when pressed, may execute other functions. However, as an example, the "Doodle" button illustrated in FIG. 6, when pressed using a button press gesture, may cause the console to generate a simulated drawing pad and a simulated pen, similar to that which is illustrated in FIG. 2A. If the "Textpad" button is pressed, a simulated keyboard and the drawing pad may be generated, similar to that which is illustrated in FIG. 4. If the "VR Messenger" button is pressed, the console may generate an interface for a communications application, such as the one illustrated in FIG. 5.

Example Move Gestures Tracked in a VR/AR/MR Environment

Figure 7:
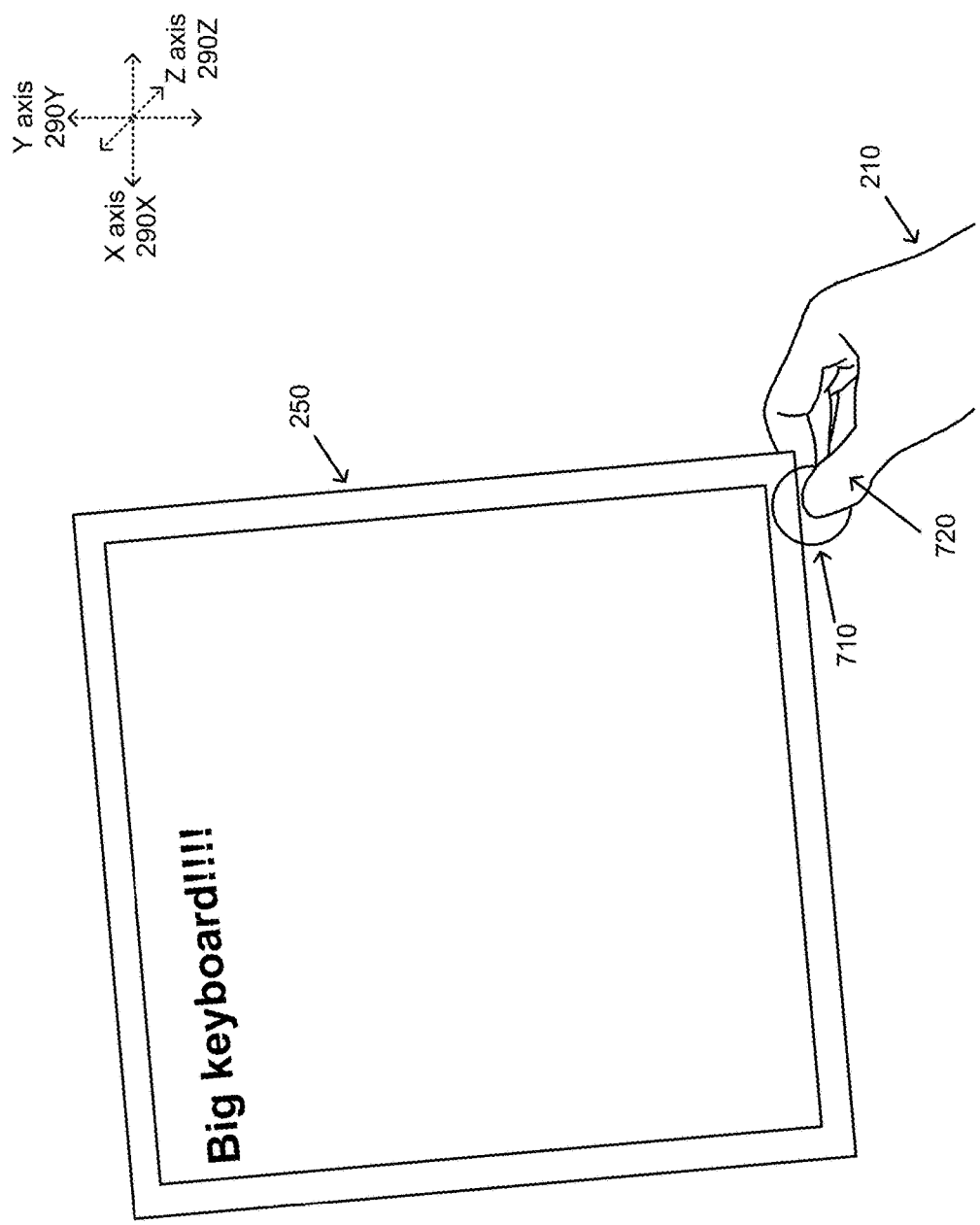
FIG. 7 illustrates hand movements causing the system to detect a move gesture, according to one embodiment.

FIG. 7 illustrates hand movements causing the system to detect a move gesture, according to one embodiment.

In one embodiment, the console 110 detects a change in pose of one hand. In particular, the console 110 detects a pinch gesture in one hand. If the pinch gesture surrounds (i.e., the fingers in the pinch gesture surround) a simulated element in the simulated environment, the console 110 may move that simulated element in a move gesture according to the movement of the user's hand. The transform gesture is indicated when a user performs a pinch gesture with one hand on a simulated element and translates the hand in one movement direction, causing the simulated element to move in correspondence. The simulated element may be moved by the console 110 such that the angle (e.g., relative orientation) between the simulated element and the user's hand stays the same, while the simulated element and the user's hand move through 3D space. In one embodiment, the console 110 provides a visual feedback indication 710 to the user to indicate that the moving gesture is initiated.

In addition to using the transform elements 610 as shown to move or transform simulated elements in the simulated environment, in other embodiments the console 110 may also detect a pushing gesture that comprises the user's fingers or hands intersecting with the simulated element. The pushing gesture is indicated when a user's hand intersects with a simulated element and causes the simulated element to move in accordance with the movement of the user's hand. Upon the intersection, the console 110 may translate the simulated element to avoid the user's hand (or fingers) clipping into the simulated element. The orientation of the simulated element may remain the same during the translation. This produces an effect whereby the user is pushing the simulated element. This also achieves the effect of moving the simulated element.

Example Remote Control Simulation Gestures Tracked in a VR/AR/MR Environment

Figure 8:
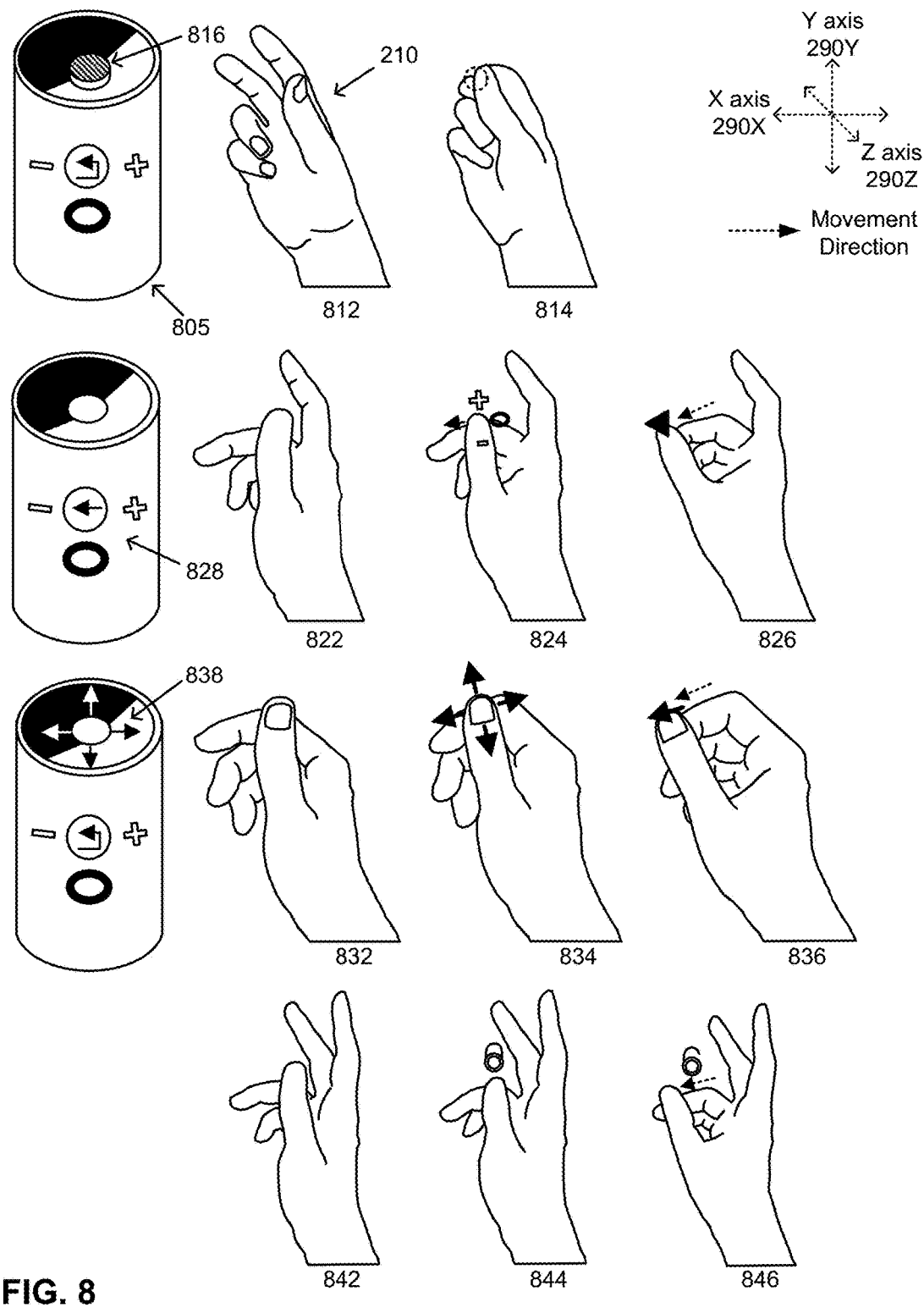
FIG. 8 illustrates hand movements causing the system to detect various remote control simulation gesture, according to one embodiment.

FIG. 8 illustrates hand movements causing the system to detect various remote control simulation gestures, according to one embodiment.

In one embodiment, the console 110 detects a change in pose between the thumb and fingers of a user's hand. Different variations in these changes in pose cause the console 110 to recognize different remote control simulation gestures. These remote control simulation gestures are meant to simulate the operations of a remote control. Note that while a remote control 805 is illustrated in the figure, no remote control may be present in real life or in the simulated environment when a user performs the gestures described below. Instead, the remote control 805 shown here is intended to clarify the effect of the gestures. Alternatively, a simulated remote control similar to the remote control 805 may be presented in the simulated environment to provide visual feedback for the user when performing the gestures described below.

The poses shown at 812 and 814 show a selection button gesture. A selection button gesture indicates that a user has made a selection of an option presented in the simulated environment, and is indicated by poses of the user's hand where at least one of the users fingers closes against the user's extended thumb. At 812, the thumb, index finger, and middle finger of the hand 210 are in an open position (where the fingers are substantially straight by a set degree), and at 814, the index finger and middle finger transition to a closed position while the thumb remains in an extended position such that the distance between the distal portion of the thumb and index finger are within a threshold distance (e.g., 5 mm). This change in pose indicates the selection button gesture, which corresponds to pressing a selection button 816 on a remote control 805. Here, closed refers to a position where the distal end of a finger is within a threshold distance from the palm of the hand, while an extended position of the finger is a position where the finger is completely extended and forms a single plane with the palm.

The poses shown at 822, 824, and 826 indicate a multi-function gesture. A multi-function gesture indicates the selection of one option in a set of options oriented in simulation in cardinal directions around a user's thumb. The selection is achieved through the movement of the user's thumb to one of the options. The multi-function gesture is recognized when the user's index finger is extended, with the other fingers of the user in a closed position, and the user's thumb over the user's middle finger. At pose 822, the index finger is in an extended position, while the thumb is orthogonal to the middle finger. The middle finger and the thumb are both extended and not closed. The distance between the middle finger and thumb may be greater than a threshold amount. At pose 824, the thumb is moved down to the middle finger such that the distance between the thumb and the middle finger is below the threshold. Note the thumb was previously "above," or away from, the user's fingers (rather than in-between the user's fingers). The console 110 recognizes this change in pose as a multifunction display gesture, and may present a set of simulated display elements near the distal end of the user's thumb. The display elements indicate different options, such as volume up, volume down, play, pause, rewind, fast forward, go back, select, and so on. For example, the different options may be those indicated at 828. The options are arranged radially around the distal end of the thumb, and may be aligned according to the lengthwise orientation of the thumb. At pose 826, the user's thumb is moved towards the direction of one of the display elements indicating different options. The movement may be beyond a certain threshold distance. This may be recognized by the console 110 as a multifunction selection gesture for the option corresponding to the display element that the user's thumb was moved towards. The console 110 may perform the action related to the selected option. Additionally, if the user performs the movement shown in pose 826 two times in a row with a maximum time separation between the two movements, the console 110 may detect a double swipe gesture, which may cause the console 110 to display a contextual menu or perform an action related to a contextual function.

The poses shown at 832, 834, and 836 indicate a directional pad (d-pad) gesture. A d-pad gesture indicates the selection of one direction in a set of directions oriented in simulation around a user's thumb. The selection is achieved through the movement of the user's thumb to one of the directions. The d-pad gesture is recognized when the user's fingers are in a closed position, with the user's thumb over the user's index finger. At pose 832, the index finger is in a half-closed position (e.g., closed by 50%) such that it is roughly orthogonal to the thumb (within a threshold angle). The thumb is a threshold distance apart from the index finger. The remaining fingers are also semi-closed. At pose 834, the thumb is moved within a threshold distance to the index finger, and the console 110 detects this as a d-pad display gesture. A directional pad is displayed in the simulated environment with various directional arrows is arranged radially from the location corresponding to the distal end of the thumb. The displayed directions may be equally spaced. For example, four directions illustrated in FIG. 8 correspond to a d-pad 838 on a remote controller. At pose 836, the user's thumb is moved to one of the displayed directions. This indicates to the console 110 a d-pad selection gesture. The console 110 may perform the action related to the selected d-pad direction.

The poses shown at 842, 844, and 846 indicate a locking or unlocking gesture. In response to the locking gesture, the console 110 may lock the virtual remote control from further input. In other words, any of the above poses, in the locked mode, will not cause the console 110 to respond. At pose 842, the index and middle finger are extended, and the ring finger is roughly orthogonal to the thumb. The thumb is a threshold distance away from the ring finger. Contrast this with the multifunction option and d-pad gestures, where one, or no fingers are extended, respectively. At pose 844 the thumb moves to within a minimum distance to the ring finger. This indicates a locking gesture to the console 110, which enables the lock mode. At post 846, the thumb makes a sliding motion to the distal point of the ring finger. This is recognized by the console 110 as an unlocking gesture, and the console 110 disables the lock mode in response. The motion of the user's fingers in the locking gesture may be opposite to the motion in the unlocking gesture.

Exemplary Snap Gesture

Figure 9:
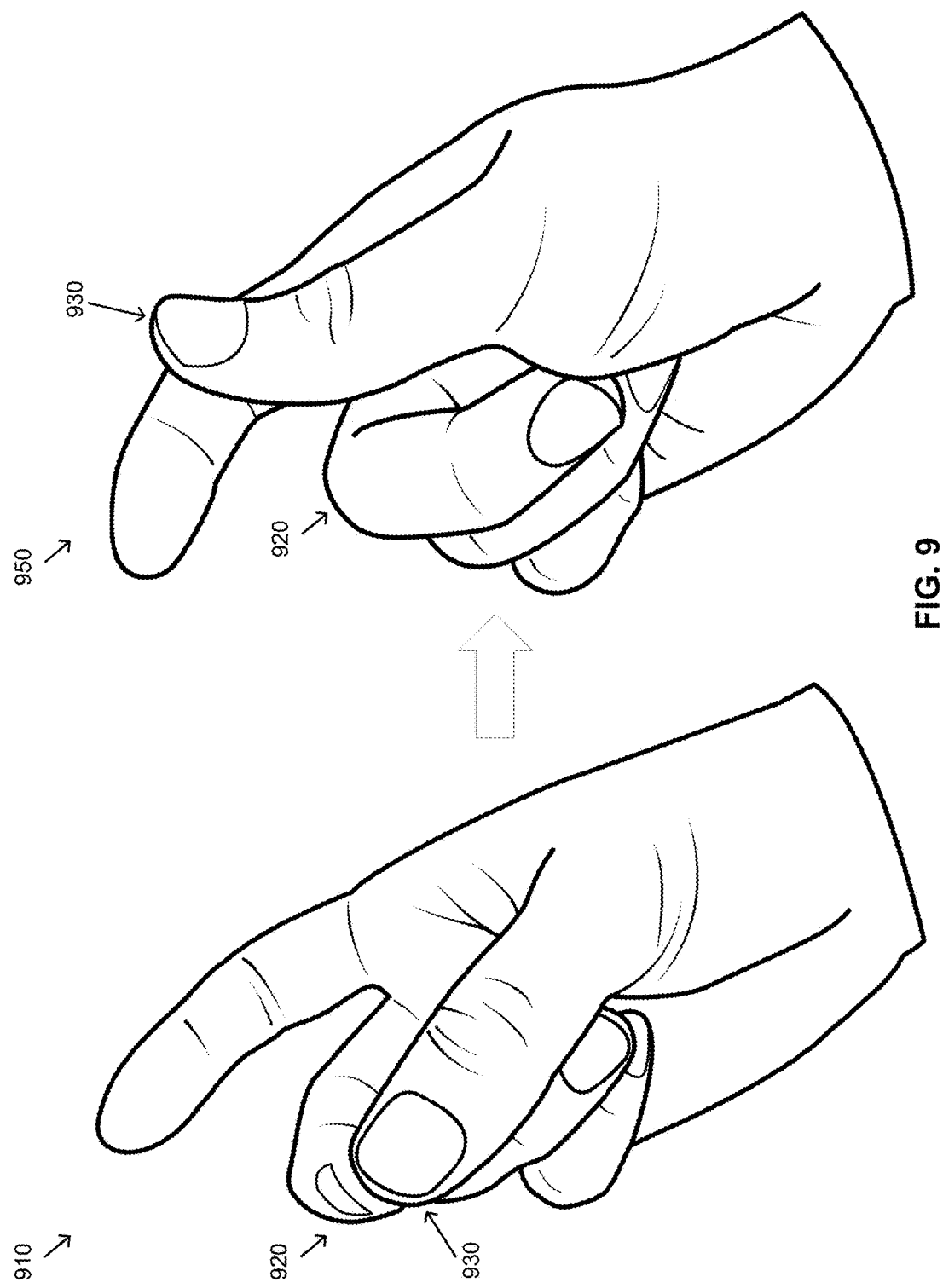
FIG. 9 illustrates hand movements causing the system to detect a snap gesture, according to one embodiment.

FIG. 9 illustrates hand movements causing the system to detect a snap gesture, according to one embodiment. A snap gesture is a gesture that may trigger a command, context sensitive action, or other function if detected by the console 110 in the simulated environment.

The console 110 may detect the snap gesture when the console 110 detects a change in the pose of a user's hand (left or right) from a pose 910 where the distal portions of the user's middle finger 920 and thumb 930 are within a minimum distance of each other, to a pose 950 where the user's middle finger 920 and thumb 930 are separated from each other by at least a minimum distance, and with the user's thumb 930 extended out, while the user's middle finger 920 is retracted or curled inwards. Furthermore, the console 110 only detects a snap gesture when the change in pose from the pose 910 to the pose 950 occurs within a threshold time (e.g., 1 sec).

Upon detecting the snap gesture, the console 110 may perform a variety of actions. For example, the console 110 may activate a command associated with the snap gesture (e.g., starting a playback of a content item), or may enable a contextual menu, or any other function.

Gesture Feedback and Other Considerations

In all of the gestures described above, the console 110 may provide some sort of feedback, such as a visual feedback at the location of the hand or finger when the gesture occurs, audio feedback, or tactile feedback. Examples of such feedback include visual ripples, audio cues, vibrations (e.g., using a vibration motor), and so on.

In the gestures described above, the response by the console 110 terminates when the gesture ends. For gestures involving pinching gestures, the console 110 may end the action that was caused by the gesture when the pinching gesture ends (i.e., no more pinching). For gestures with button presses, the action may end when the user's hand retracts from the simulated button interface.

Note that although the above description was made primarily in regards to the console 110, in other embodiments the console passes the raw pose data (e.g., joint information) and/or gesture information (e.g., which gesture was performed) to an application via the execution engine 155. The application may use this information and respond to it as necessary.

While many of the elements described here are simulated, in other embodiments the simulated elements may be based on real-life counterparts. For example, a simulated writing pad or a simulated pressable element may correspond with a flat surface in reality.

Additionally, while the different positions of the fingers and hands are described above as being related to each other by some geometric relations (e.g., "orthogonal"), this is not meant to indicate that the fingers or hands must be exactly related in the specified geometric relationship for the pose and/or gesture to be detected. Instead, these geometric relationships are provided as a way of describing the positions of the hands. In practice, the console 110 may use a neural network with a large training set. This training set may include as input many different users making one or more of the gestures described here. Each of these inputs may vary slightly from each other, although they may all be generally similar. The console 110 is able to use this training data to determine for a newly encountered hand the type of gesture that is being performed, even if the poses in the gesture from the newly encountered hand does not exactly match those poses described above.

In addition, any interaction by the user's fingers or hands with some element in the simulated environment, such as a simulated button, slider element, and so on, may be also interacted with using various simulated tools, such as simulated pens, in the simulated environment.

Example Flow

Figure 10:
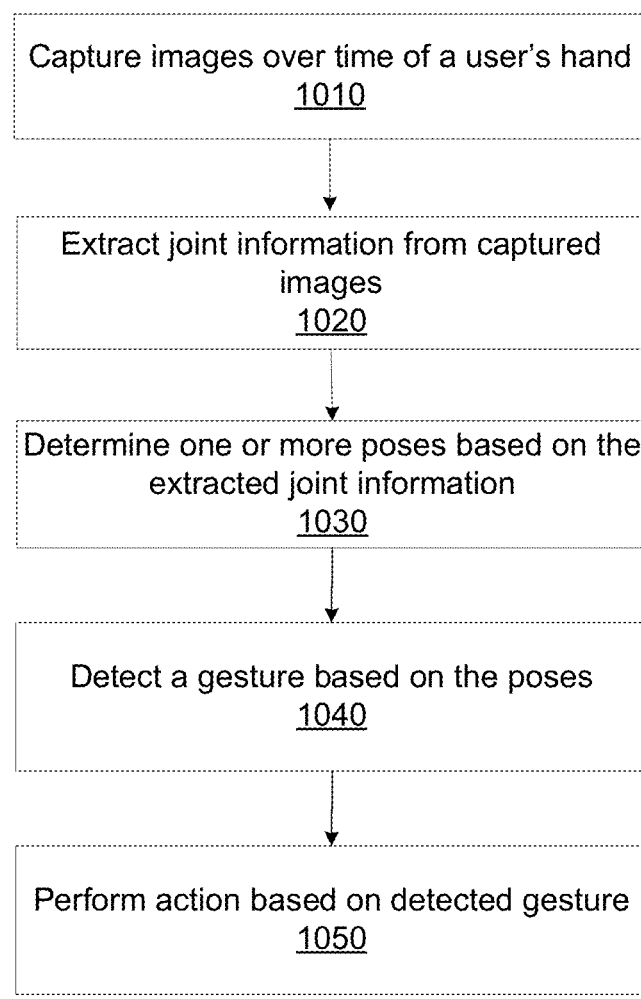
FIG. 10 is a flowchart of one embodiment of a process for tracking a user's hands to determine gestures, in accordance with an embodiment.

FIG. 10 is a flowchart of one embodiment of a process 1000 for tracking a user's hands to determine gestures, in accordance with an embodiment. The process 1000 may be performed by the console 110 in some embodiments. Alternatively, other components may perform some or all of the steps of the process 1000. Additionally, the process 1000 may include different or additional steps than those described in conjunction with FIG. 10 in some embodiments or perform steps in different orders than the order described in conjunction with FIG. 10.

The console 110 captures 1010 images over time of a user's hand using an imaging device. These images may include supplemental information, such as depth data. Using the captured images (and supplemental information if available), the console 110 extracts 1020 joint information from the captured images. For example, as described, the tracking module 150 may utilize a neural network to determine a most likely (or top most likely) joint positions of the user's hands based on the captured images and supplemental depth data captured alongside the images. This joint information indicates the positions of joints on the user's hands, and the motion of the joints over time.

The console 110 determines 1030 one or more poses for the user's hand(s) based on the extracted joint information. For example, as described above, the tracking module 150 of the console 110 may determine the poses of the user's hand from the joint information using inverse kinematics. The poses indicate particular combinations of positions of the user's hand. By combining these poses, the console 110 further detects 1040 a gesture of the user's hand based on these poses. As described above, this may be achieved using a combination of a neural network and other processes, such as an inverse kinematics solver. For example, the gesture may be a d-pad selection gesture, as described above. In response to the detected gesture, the console 110 may further perform 1050 some related action, such as display a simulated d-pad.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. For example, in some embodiments, the sensor module 142 may include designed hardware for imaging and image processing that computes optical flow information. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments of the disclosure is intended to be illustrative, but not limiting, of the scope of the disclosure, which is set forth in the following claims.

What is claimed is:

1. A system comprising:
   an electronic display configured to display one or more simulated objects in accordance with display instructions;
   an imaging sensor configured to capture images of a user's hands; and
   a console configured to:
      receive the captured images from the imaging sensor;
      extract joint information of the user's hands from the captured images;
      determine one or more poses based on the extracted joint information; and
      in response to the determination that the poses indicate the user's index finger positioned orthogonally to the user's thumb, and the thumb is in contact with the index finger, detect a directional pad display gesture; and in response to the detection of the direction pad display gesture, update the display instructions to cause the electronic display to generate a simulated directional pad adjacent to the user's thumb in a simulated environment that is presented to the user via the electronic display, the simulated directional pad indicating each of one or more selection directions each with a simulated arrow, the selection of the one or more selection directions detected based on a detection of further determined poses indicating a movement of a distal end of the user's thumb.

2. The system of claim 1, wherein the console is further configured to:

in response to the determination that the poses indicate the user's thumb is moving in a selected direction, the selected direction being one of the selection directions indicated on the simulated direction pad, detect a directional pad selection gesture;

in response to the detection of the directional pad selection gesture, execute instructions associated with the selected direction; and in response to the detection of the directional pad selection gesture, update the display instructions to cause the electronic display to generate a change in simulated content presented to the user.

3. The system of claim 1, wherein the console is further configured to:

in response to the determination that the poses indicate the user's index finger is extended, the user's middle finger is positioned orthogonally to the user's thumb, and the thumb is within a minimum distance to the index finger, detect a multifunction display gesture;

in response to the detection of the multifunction display gesture, generate a simulated display of multiple options for selection, the multiple options arranged radially and adjacent to the user's thumb in the simulated environment; and in response to the detection of the multifunction display gesture, update the display instructions to cause the electronic display to generate the simulated display of multiple options via the electronic display.

4. The system of claim 3, wherein the console is further configured to:

in response to the determination that the poses indicate the user's index finger moving in a selected option, the selected option being one of the options indicated on the simulated display of multiple options, detect a multifunction selection gesture;

in response to the detection of the multifunction selection gesture, execute instructions associated with the selected option; and in response to the detection of the multifunction selection gesture, update the display instructions to cause the electronic display to generate a change in simulated content presented to the user.

5. The system of claim 1, wherein the console is further configured to:

in response to the determination that the poses indicate the user's thumb on the user's dominant hand is substantially orthogonal to the lateral side of the user's index finger, and the distal portion of the thumb being within a minimum distance to the index finger, detect a pen-holding gesture;

in response to the detection of the pen-holding gesture, generate a simulated pen between the user's thumb and the users index finger, the simulated pen capable of simulated writing on a simulated pad; and in response to the detection of the pen-holding gesture, update the display instructions to cause the electronic display to generate the simulated pen.

6. The system of claim 5, wherein the console is further configured to:

in response to the determination that the poses indicate the distal portion of the thumb being exceeding the minimum distance to the index finger, detect a contextual menu gesture;

in response to the detection of the contextual menu gesture, generate a simulated contextual menu adjacent to the simulated pen; and in response to the detection of the contextual menu gesture, update the display instructions to cause the electronic display to generate the simulated contextual menu.

7. The system of claim 1, wherein the console is further configured to:

in response to a detection that the user is holding a physical pen device, detect a pen-holding gesture;

in response to the detection that the user is holding a physical pen device, generate a simulated pen between the user's thumb and the users index finger, the simulated pen capable of writing on a simulated pad and mirroring the position of the physical pen device relative to the user's hand; and in response to the detection that the user is holding a physical pen device, update the display instructions to cause the electronic display to generate the simulated pen.

8. The system of claim 1, wherein the console is further configured to:

in response to the determination that the poses indicate that one of the user's fingers is elongated and that the distal portion of the one finger is intersecting a simulated pressable element in the simulated environment that is presented to the user via the electronic display, detect a button press gesture;

in response to the detection of the button press gesture, update the display instructions to generate a simulated button press in the pressable element to the user via the electronic display;

in response to the detection of the button press gesture, execute instructions associated with the button press gesture for the pressable element; and in response to the detection of the button press gesture, update the display instructions to cause the electronic display to generate a change in simulated content presented to the user associated with the pressable element.

9. The system of claim 8, wherein the console is further configured to:

in response to the determination that the poses indicate that the one finger is moving in a direction orthogonal to a previous movement direction of the one finger, detect a sliding gesture;

in response to the detection of the sliding gesture, execute instructions associated with the pressable element for the sliding gesture to cause a translational movement in simulated content; and in response to the detection of the sliding gesture, update the display instructions to cause the electronic display to generate a translational movement in the simulated content.

10. The system of claim 1, wherein the console is further configured to:
in response to the determination that the poses indicate the distal portion of the user's thumb is within a minimum distance to the distal portion of the user's index finger, wherein the user's hand is moving along one axis, and wherein the user's thumb and the user's index finger surround a scrolling element detect a pinch scroll gesture;
in response to the detection of the pinch scroll gesture, execute instructions associated with the scrolling element for a scrolling action to cause a translational movement in simulated content; and
in response to the detection of the pinch scroll gesture, update the display instructions to cause the electronic display to generate the translational movement in the simulated content.

11. The system of claim 1, wherein the console is further configured to:
in response to the determination that the poses indicate that both the user's hands are performing a pinch gesture, each hand pinching one transform element of a simulated element in the simulated environment, the distance between the two hands changing over time, detect a transform gesture;
in response to the detection of the transform gesture, execute a transform on the simulated element based on the positions of each hand, the transform of the simulated element changing a dimension of the simulated element; and
in response to the detection of the pinch scroll gesture, update the display instructions to cause the electronic display to generate the transform of the simulated element.

12. The system of claim 1, wherein the console is further configured to:
in response to the determination that the poses indicate that one of the user's hand is performing a pinch gesture on a simulated element in the simulated environment, the user's hand moving over time, detect a moving gesture;
in response to the detection of the moving gesture, execute a move on the simulated element based on the position of the hand; and
in response to the detection of the moving gesture, update the display instructions to cause the electronic display to generate the move of the simulated element.

13. The system of claim 1, wherein the console is further configured to:
in response to the determination that the poses indicate that one of the user's hand is performing a pinch gesture using two fingers and a thumb, detect a selection button gesture, and
in response to the detection of the selection button gesture, execute an action associated with the selection button gesture; and
in response to the detection of the selection button gesture, update the display instructions to cause the electronic display to generate a change in simulated content presented to the user.

14. The system of claim 1, wherein the console is further configured to:

in response to the determination that the poses indicate the user's index finger and middle finger are extended, the user's ring finger positioned orthogonally to the user's thumb, and the thumb within a minimum distance to the ring finger, detect a lock gesture; and
in response to the detection of the lock gesture, execute an input lock action to disable changes in the presentation of simulated elements to the user via the electronic display for those simulated elements associated with the input lock action.

15. The system of claim 1, wherein the console is further configured to:
in response to the determination that the poses indicate the user's index finger and middle finger are extended, the user's ring finger positioned orthogonally to the user's thumb, and the thumb within a minimum distance to the distal portion of the ring finger, detect an unlock gesture; and
in response to the detection of the unlock gesture, execute an input unlock action to enable changes in the presentation of simulated elements to the user via the electronic display for those simulated elements associated with the input lock action.

16. A system comprising:
an imaging sensor configured to capture images of a user's hands;
a head-mounted display (HMD) comprising:
an electronic display configured to display one or more simulated objects in accordance with display instructions;
wherein the HMD is further configured to:
receive the captured images from the imaging sensor;
extract joint information of the user's hands from the captured images;
determine one or more poses based on the extracted joint information; and
in response to the determination that the poses indicate the user's index finger positioned orthogonally to the user's thumb, and the thumb is in contact with the index finger, detect a directional pad display gesture; and
in response to the detection of the direction pad display gesture, update the display instructions to cause the electronic display to generate a simulated directional pad adjacent to the user's thumb in a simulated environment that is presented to the user via the electronic display, the simulated directional pad indicating each of one or more selection directions each with a simulated arrow, the selection of the one or more selection directions detected based on a detection of further determined poses indicating a movement of a distal end of the user's thumb.

17. The system of claim 16, wherein the HMD is further configured to:
in response to the determination that the poses indicate a distal end of the user's thumb is moved in a selected direction, the selected direction being one of the selection directions indicated on the simulated direction pad, detect a directional pad selection gesture;
in response to the detection of the directional pad selection gesture, execute instructions associated with the selected direction; and
in response to the detection of the directional pad selection gesture, update the display instructions to cause the electronic display to generate a change in simulated content presented to the user.

18. The system of claim 16, wherein the HMD is further configured to:
- in response to the determination that the poses indicate the user's index finger is extended, the user's middle finger positioned orthogonally to the user's thumb, and the thumb within a minimum distance to the index finger, detect a multifunction display gesture;
- in response to the detection of the multifunction display gesture, generate a simulated display of multiple options for selection, the multiple options arranged radially and adjacent to the user's thumb in the simulated environment; and
- in response to the detection of the multifunction display gesture, update the display instructions to cause the electronic display to generate the simulated display of multiple options via the electronic display.

19. The system of claim 18, wherein the HMD is further configured to:
- in response to the determination that the poses indicate the user's index finger moving in a selected option, the selected option being one of the options indicated on the display of multiple options, detect a multifunction selection gesture;
- in response to the detection of the multifunction selection gesture, execute instructions associated with the selected option; and
- in response to the detection of the multifunction selection gesture, update the display instructions to cause the electronic display to generate a change in simulated content presented to the user.

20. The system of claim 16, wherein the HMD is further configured to:
- in response to the determination that the poses indicate the user's thumb on the user's dominant hand is substantially orthogonal to the lateral side of the user's index finger, the distal portion of the thumb being within a minimum distance to the index finger, detect a pen-holding gesture;
- in response to the detection of the pen-holding gesture, generate a simulated pen between the user's thumb and the users index finger, the simulated pen capable of writing on a simulated pad, and
- in response to the detection of the pen-holding gesture, update the display instructions to cause the electronic display to generate the simulated pen.

* * * * *

UNITED STATES PATENT AND TRADEMARK OFFICE
CERTIFICATE OF CORRECTION

PATENT NO. : 10,261,595 B1
APPLICATION NO. : 15/600689
DATED : April 16, 2019
INVENTOR(S) : Kenrick Cheng-kuo Kin It is certified that error appears in the above-identified patent and that said Letters Patent is hereby corrected as shown below:

In the Claims

Column 22, Claim 8, Line 40, delete "fingers is" and insert -- finger is --.

Column 23, Claim 10, Line 12, delete "element" and insert -- element, --.

Signed and Sealed this
Seventeenth Day of September, 2019

Andrei Iancu
*Director of the United States Patent and Trademark Office*